United States Patent
Yeung et al.

(10) Patent No.: US 9,986,069 B2
(45) Date of Patent: May 29, 2018

(54) DEVICES AND METHODS TO COMPRESS SENSOR DATA

(71) Applicant: Intel Corporation, Santa Clara, CA (US)

(72) Inventors: Fai Yeung, Palo Alto, CA (US); Jinshi James Huang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/279,307

(22) Filed: Sep. 28, 2016

(65) Prior Publication Data
US 2018/0091630 A1 Mar. 29, 2018

(51) Int. Cl.
*H04L 12/26* (2006.01)
*H04L 29/06* (2006.01)
*H04B 1/3827* (2015.01)
*H04W 4/00* (2018.01)

(52) U.S. Cl.
CPC ............. *H04L 69/04* (2013.01); *H04B 1/385* (2013.01); *H04L 43/02* (2013.01); *H04W 4/008* (2013.01)

(58) Field of Classification Search
CPC ......... H04L 69/04; H04L 43/02; H04B 1/385; H04W 4/008
See application file for complete search history.

(56) References Cited

U.S. PATENT DOCUMENTS

| 5,083,310 A * | 1/1992 | Drory | .............. G11B 20/00007 375/245 |
| 6,745,012 B1 | 6/2004 | Ton et al. | |
| 2002/0131566 A1 | 9/2002 | Stark et al. | |
| 2009/0054737 A1* | 2/2009 | Magar | ................. A61B 5/0205 600/300 |
| 2010/0082302 A1 | 4/2010 | Garudadri et al. | |
| 2011/0136536 A1 | 6/2011 | Garudadri | |
| 2011/0254760 A1 | 10/2011 | Lloyd et al. | |
| 2012/0013758 A1* | 1/2012 | Frederiksen | ............. H04N 9/67 348/222.1 |

(Continued)

FOREIGN PATENT DOCUMENTS

| CN | 104933846 | 9/2015 |
| WO | WO-2014201132 A1 | 12/2014 |

OTHER PUBLICATIONS

Chen, Chien-Chia, "A Survey on Sub-Nyquist Sampling", (Dec. 5, 2009), 8 pgs.

(Continued)

*Primary Examiner* — Syed Haider
(74) *Attorney, Agent, or Firm* — Schwegman Lundberg & Woessner, P.A.

(57) ABSTRACT

Devices and methods to compress sensor data are generally described herein. An exemplary wearable device to compress sensor data may include a sensor including circuitry to sense sensor data, and a communication circuit to receive, from a remote device, a detected link quality of a low-power communication channel used to communicate with the remote device. The communication circuit further to transmit compressed data to a remote device over the low power communication channel. The wearable device may further include a compressible sensor data module to apply a compression algorithm to compress received sensor data based on the detected link quality to provide the compressed sensor data.

6 Claims, 9 Drawing Sheets

(56) References Cited

U.S. PATENT DOCUMENTS

| | | | |
|---|---|---|---|
| 2013/0128902 A1* | 5/2013 | Ilan | H04L 69/04 370/477 |
| 2014/0046208 A1 | 2/2014 | Sejdic et al. | |
| 2014/0188348 A1 | 7/2014 | Gautama et al. | |
| 2016/0142518 A1* | 5/2016 | Raina | H04L 69/04 370/230 |

OTHER PUBLICATIONS

Chen, Wei, "Energy Efficient Signal Acquisition in Wireless Sensor Networks: A Comprehensive Sensing Framework", (Aug. 1, 2011), 17 pgs.

"International Application Serial No. PCT/US2017/045874, International Search Report dated Oct. 27, 2017", 3 pgs.

"International Application Serial No. PCT/US2017/045874, Written Opinion dated Oct. 27, 2017", 10 pgs.

* cited by examiner

DEVICES AND METHODS TO COMPRESS SENSOR DATA

BACKGROUND

In many wearable devices and Internet-of-Things (IoT), sensors (such as accelerometers, gyroscopes, barometers, etc.) may be used to collect various types of data, and provide the collected data to a remote processing unit. For various reasons, such as size and usage time requirements, power consumption may be very restricted. In these low transmission power scenarios, distances between sensors, and interference from other signals can greatly affect throughput. The bandwidth limitation can be a challenge for many wearables that collect data at a much higher rate than can be transmitted to a remote device. Further, in some applications, multiple sensors can feed a single transmitter, which can make transmission of the collected data even more challenging.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Examples of a low power compressible sensor system that includes one or more wearable devices that collect and provide sensed data using a low power transmission protocol to a remote device. The wearable devices may include sensors that directly sense the data, or may be connected to one or more connected sensors to receive sensor information. In some examples, the wearable devices may apply a compress algorithm on the sensor data received from the sensor to control the transmission bitrate based on a detected transmission channel throughput. In other examples, the wearable devices may control the sample rate of the sensors to control transmission bandwidth.

Figure 1:
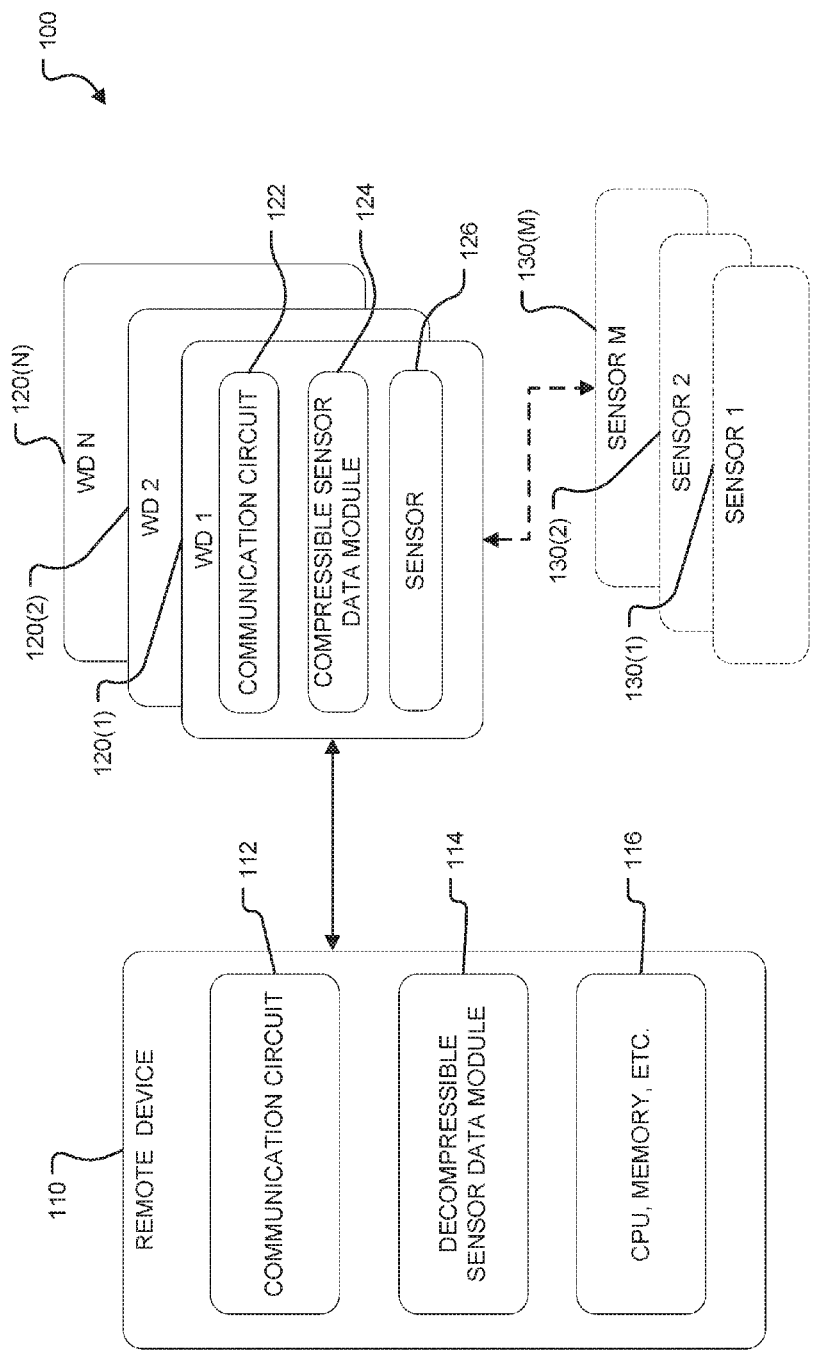
FIG. 1 illustrates a low power compressible sensor system to compress sensor data in accordance with some embodiments of the disclosure.

FIG. 1 illustrates a low power compressible sensor system 100 to compress sensor data in accordance with some embodiments of the disclosure. The system 100 may include a remote device 110 coupled one or more of the wearable devices 120(1-N). One or more of the wearable devices 120(1-N) may be coupled to one or more of the sensors 130(1-M), in some examples.

The remote device 110 may include a communication circuit 112, a decompressible sensor data module 114, and a CPU, memory, etc. 116. The communication circuit 112 may communicate with the wearable devices 120(1-N) via a radio to receive collected sensor data signals. In some examples, the communication may use a low power/energy protocol, such as a Bluetooth® Low Energy (BLE). The 112 may detect a respective link quality of the communication channel for communication with the wearable devices 120 (1-N), and may provide the respective link quality to the associated wearable device 120(1-N). The decompressible sensor data module 114 may include circuitry to receive the collected sensor data signals from the communication circuit 112, and may reconstruct the collected sensor data based on the signals. In some examples, the decompressible sensor data module 114 may also include an algorithm to select a subsampling rate for several of integrated sensor 126 and the sensors 130(1-M) based on error rates and other criteria. The CPU, memory, etc. 116 may include may include special circuitry and/or general-purpose hardware processor to perform specific functions with the collected sensor data reconstructed by the decompressible sensor data module 114. For example, the CPU, memory, etc. 116 may process the collected sensor data to display information to a user, such as a visual representation of motion data.

The wearable devices 120(1-N) may each include a respective communication circuit 122, a respective compressible sensor data module 124, and the respective integrated sensor 126. Each of the communication circuit 122 may communicate with the remote device 110 over a channel via a respective radio to provide the collected sensor data. The communication circuit 122 may receive a channel throughput indication (e.g., link quality) from the communication circuit 112 of the remote device 110 prior to communication. The communication circuit 122 may provide the link quality to the compressible sensor data module 124, and the compressible sensor data module 124 may apply a compression algorithm on the collected sensor data to reduce a transmission bitrate based on the detected channel throughput. The compressible sensor data module 124 may include also interface to receive the collected sensor data from the integrated sensor 126, one or more of the sensors 130(1-M), or combinations thereof. In some examples, the compressible sensor data module 124 may control the sample rate of the one or more of the integrated sensor 126 or the sensors 130(1-M) to control a transmission bandwidth. The collected sensor data may include motion, pressure, sound, light, location, proximity, etc. data.

Each of the integrated sensor 126 and the sensors 130(1-M) may include circuitry to collect sensor data directly. The integrated sensor 126 may be included as part of the wearable devices 120(1-N) and the sensors 130(1-M) may be remote to the wearable devices 120(1-N) and connected to the wearable devices 120(1-N) directly via a wired connection or via a wireless connection. Examples of the integrated sensor 126 and the sensors 130(1-M) may include gyroscopes, accelerometers, GPS receivers, microphones, light detection circuits, proximity sensing circuits, barometers, etc. The sensors 130(1-M) may be wearable devices, in some examples.

In operation, the system 100 may include the respective communication circuit 122 and the respective compressible sensor data module 124 of the wearable devices 120(1-N) and several of the sensors 130(1-M), the respective integrated sensor 126 of the wearable devices 120(1-N), or combinations thereof, to collect various kinds of sensor data. In many cases, sensors (e.g., the sensors 130(1-M), the respective integrated sensor 126 of the wearable devices 120(1-N), or combinations thereof) may be located away from the remote device 110 used to process the collected sensor data. Therefore, the collected sensor data may be transmitted from the sensors to the communication circuit 112 of the remote device 110 over a wireless communication channel. In some examples, due to a form factor restriction and/or long usage time requirement, the power consumption of the sensors may be very restricted. Thus, a low power communication channel may be used to transmit the data to the communication circuit 112. An example of a low power communication channel may include Bluetooth® Low Energy (BLE) technology. However, when using a low power communication channel, the number of sensors, the distance between the sensors and the remote device 110, and interference from other radio signals may impact an effective throughput of low power communication channel, sometimes reducing the throughput to a bandwidth on the order of a few tens of kilobits per second. This bandwidth limitation may be a challenge where multiple sensors are collecting data to be transmitted to the communication circuit 112 contemporaneously. In some examples, the sensors may sample 16 bits per sample at over 100 Hz frequency.

In some embodiments, to accommodate the bandwidth and power constraints, the respective compressible sensor data module 124 of each of the wearable devices 120(1-N) may apply a compression algorithm to the collected sensor data to provide a compressed sensor data signal, and the compressed sensor data signal may be provided to the communication circuit 112 of the remote device via the communication circuit 122. The compression algorithm may exploit redundancy or repetition in the collected sensor data to reduce information to be transmitted to the communication circuit 112. The communication circuit 112 may provide the compressed sensor data signal to the decompressible sensor data module 114, which may reconstruct the collected sensor data. 112. Communication circuit 112 at the receiver detects the link quality. Communication circuit 112 at the remote device 110 may then notify communication circuit 122 at the wearable devices 120(1-N) of the link quality in the back channels. Based on the detected link quality, the compressible sensor data module 124 at 120 (1-N) may set a level of compression to apply to the collected sensor data. The selected compression level may reduce a transmission bitrate of the collected sensor data by a factor of one of 2, 4, 6, 8, or more. In some examples, the compression algorithm may include one of differential pulse-code modulation (DPCM) or adaptive delta pulse-code modulation (ADPCM). In some examples, the compression algorithm may be reset responsive to an indication the link to the communication circuit 112 has been lost. In some examples, the compression algorithm may be reset responsive to an indication from the communication circuit 112 that previous data packets have not been successfully transmitted and received. The compression algorithm may also be reset to limit or prevent error propagation caused by the compression algorithm based on an indication from the decompressible sensor data module 114 via the communication circuit 112.

In another example to accommodate bandwidth constraints, the remote device 110 and the compressible sensor data module 124 may control sample rates of the sensors (e.g., each of the respective integrated sensor 126, the sensors 130(1-M), or combinations thereof) to reduce bandwidth consumption, and thereby shifting a processing burden to the remote device 110 during signal reconstruction, as compared with a processing burden of executing a compression algorithm at the wearable devices (120(1-N)). The remote device 110 may exploit previously collected information about the sources (e.g., type of sensor and location of a wearable sensor) of sensor data and adjust a different subsampling rate for each sensor. In other words, the subsampling rate is adjusted individually according to the sparseness of sensor data from a specific sensor.

In a wearable application monitoring motion of different areas of a body of a person, certain sensors may have more sparse motion data than other sensors. For example, a sensor on a shoulder of a baseball pitcher throwing a pitch may have much more sparse data than a sensor on the wrist. In this example, the compressible sensor data module 124 may control the sensors to use sub-Nyquist sampling techniques. To determine an optimal subsampling rate without previously collected information, the decompressible sensor data module 114 of the remote device 110 may use sample (e.g., test or training) data. For example, the compressible sensor data module 124 may collect sample measurements from one of the sensors. The compressible sensor data module 124 (via the communication circuit 122) may iteratively provide (e.g., stream) a signal that represents the collected sample data to the decompressible sensor data module 114 (via the communication circuit 112) via the communication circuit 122 at various subsampled rates (including the fully sampled rate). The decompressible sensor data module 114 may reconstruct the collected sensor data based on the fully sampled signal and the various subsampled signals. The decompressible sensor data module 114 may calculate the root-mean-square deviations (RMSD) of the reconstructions of the various subsampled signals with the reconstruction of the fully sampled signal. The decompressible sensor data module 114 may select a target sampling rate that is a lowest sampling rate at which the RMSD falls within a threshold of acceptable errors. The selected sampling rate for a sensor used in a specific, known application may be stored at the decompressible sensor data module 114. The decompressible sensor data module 114 may use this previously collected information to select the subsampling rate in future applications, thereby avoiding having to undergo the training process The system 100 may provide methods for compressing sensor data to be transmitted over a low power communication channel, including by controlling the bitrate through sensor data compression, or by controlling a sample rate of a sensor.

Figure 2:
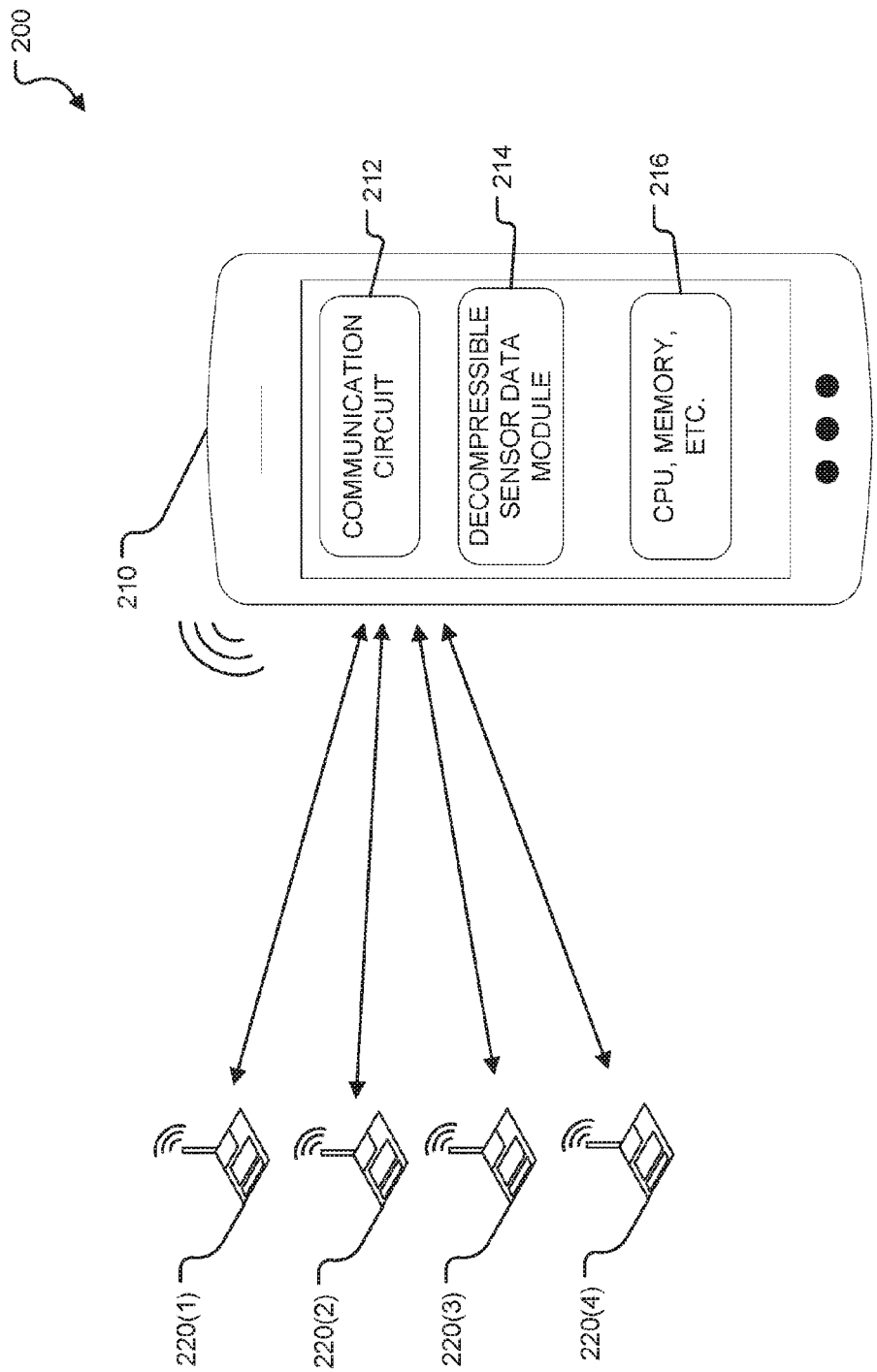
FIG. 2 illustrates a low power compressible sensor system to compress sensor data in accordance with some embodiments of the disclosure.

FIG. 2 illustrates a low power compressible sensor system 200 to compress sensor data in accordance with some embodiments of the disclosure. The system 200 may include a remote device 210 coupled one or more of the wearable devices 220(1-4).

The remote device 210 may include a communication circuit 212, a decompressible sensor data module 214, and a CPU, memory, etc. 216. The communication circuit 212 may communicate with the wearable devices 220(1-4) via a radio to receive collected sensor data signals. In some examples, the communication may use a low power/energy protocol, such as a Bluetooth® Low Energy. The communication circuit 212 may detect a link quality (e.g., indication of channel throughput) of the communication channel used to communicate with each of the wearable devices 220(1-4). The decompressible sensor data module 214 may include circuitry to receive the collected sensor data signals from the communication circuit 212, and may reconstruct the collected sensor data based on the signals. The CPU, memory, etc. 216 may include special circuitry and/or general-purpose hardware processor to perform specific functions with the collected sensor data reconstructed by the decompressible sensor data module 214. For example, the CPU, memory, etc. 216 may process the collected sensor data to display information to a user, such as a visual representation of motion data.

The wearable devices 220(1-4) may each include a respective communication circuit, a respective compressible sensor data module, and a respective sensor. Each of the communication circuit may communicate with the remote device 210 over a channel via a respective radio to provide the collected sensor data. The communication circuit may further receive a channel throughput (e.g., link quality) of the low-power communication channel from the communication circuit 212 of the remote device 210 prior to communication. The compressible sensor data module may apply a compression algorithm on the collected sensor data to provide compressed sensor data in order to reduce a transmission bitrate based on the received link quality. The compressible sensor data module may include an interface to receive the collected sensor data from the sensor. The collected sensor data may include motion, pressure, sound, light, location, proximity, etc. data. The compressible sensor data module (via the communication circuit) may provide the compressed sensor data to the communication circuit 212.

Each of the sensors of the wearable devices 220(1-4) may be integrated with the respective wearable device 220(1-4) or may be remote, and may include circuitry to collect sensor data directly. Examples of the sensor may include gyroscopes, accelerometers, GPS receivers, microphones, light detection circuits, proximity sensing circuits, barometers, etc.

In operation, the system 200 may include the respective communication circuit, the compressible sensor data module, and the sensor of the wearable devices 220(1-4) to collect various kinds of sensor data. In many cases, the wearable devices 220(1-4) may be located away from the remote device 210 used to process the collected sensor data. Therefore, the collected sensor data may be transmitted from the sensors of the wearable devices 220(1-4) to the communication circuit 212 of the remote device 210 over a wireless communication channel. In some examples, due to a form factor restriction and/or long usage time requirement, the power consumption of the wearable devices 220(1-4) may be very restricted. Thus, a low power communication channel may be used to transmit the data to the communication circuit 212. An example of a low power communication channel may include Bluetooth® Low Energy (BLE) technology. However, when using a low power communication channel, the number of sensors, the distance between the sensors and the remote device 110, and interference from other radio signals may affect an effective throughput of low power communication channel, sometimes reducing the throughput to a bandwidth on the order of a few tens of kilobits per second. This bandwidth limitation may be a challenge where multiple sensors of the wearable devices 220(1-4) are collecting data to be transmitted to the communication circuit 212 contemporaneously. In some examples, the sensors may sample 16 bits per sample at over 100 Hz frequency.

In some embodiments, to accommodate the bandwidth and power constraints, the respective communication circuit of each of the wearable devices 220(1-4) may apply a compression algorithm to the collected sensor data received from the sensor to provide a compressed sensor data signal, and the compressed sensor data signal may be provided to the communication circuit 212. The compression algorithm may exploit redundancy or repetition in the collected sensor data to reduce information to be transmitted to the communication circuit 212. The communication circuit 212 may provide the compressed sensor data signal to the decompressible sensor data module 214, which may reconstruct the collected sensor data. The communication circuit at the remote device may detects the link quality and may provide the link quality to the communication circuit at the wearable devices 220(1-N) (e.g., via back channels). Based on the detected link quality, the compressible sensor data module may set a level of compression to apply to the collected sensor data. The selected compression level may reduce a transmission bitrate of the collected sensor data by a factor of one of 2, 4, 6, 8, or more. In some examples, the compression algorithm may include one of differential pulse-code modulation (DPCM) or adaptive delta pulse-code modulation (ADPCM). In some examples, the compression algorithm may be reset responsive to an indication the link to the communication circuit 212 has been lost. In some examples, the compression algorithm may be reset responsive to an indication from the communication circuit 212 that previous data packets have not been successfully transmitted and received. The compression algorithm may also be reset to limit or prevent error propagation caused by the compression algorithm based on an indication from the decompressible sensor data module 214 via the communication circuit 212.

Figure 3:
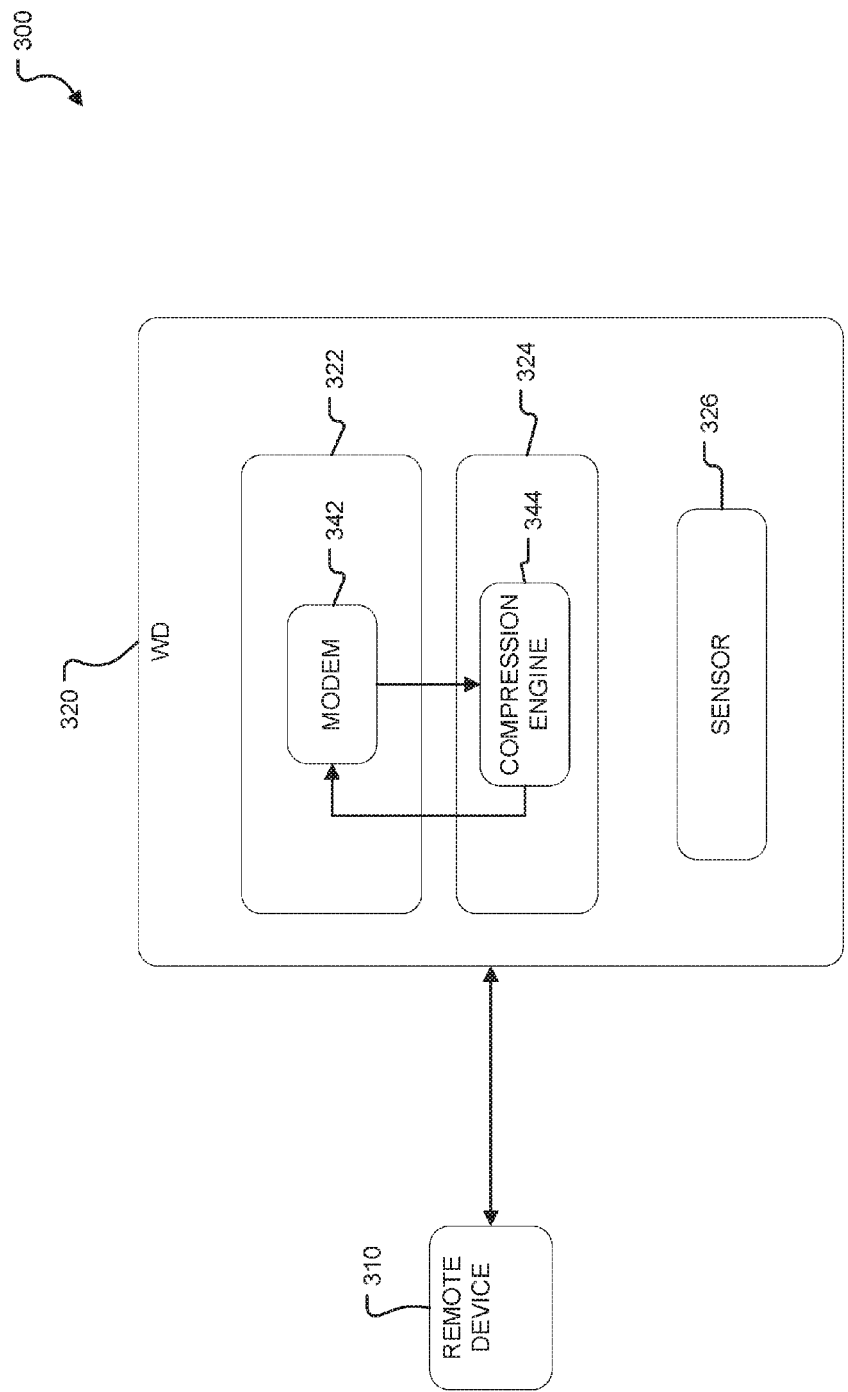
FIG. 3 illustrates a low power compressible sensor system to compress sensor data in accordance with some embodiments of the disclosure.

FIG. 3 illustrates a low power compressible sensor system 300 to compress sensor data in accordance with some embodiments of the disclosure. The system 300 may include a remote device 310 coupled a wearable device 320.

The remote device 310 may communicate with the wearable device 320 via a radio to receive collected sensor data signals. In some examples, the communication may use a low power/energy protocol, such as a Bluetooth® Low Energy (BLE). The remote device 310 may include circuitry to receive the collected sensor data signals from the wearable device 320, and may reconstruct the collected sensor data based on the signals. The remote device 310 may further include special circuitry and/or general-purpose hardware processor to perform specific functions with the reconstructed sensor data.

The wearable device 320 may include a communication circuit 322, a compressible sensor data module 324, and a sensor 326. The communication circuit 322 may include a modem 342 to communicate with the remote device 310 over a low power communication channel. The compressible sensor data module 324 may include a compression engine 344 to receive the link quality and to apply a compression algorithm to compress sensor data to provide compressed sensor data in order to reduce a transmission bitrate. The compression engine 344 may include an interface to receive the collected sensor data from the sensor 326. The collected sensor data may include motion, pressure, sound, light, location, proximity, etc., data. The compressible sensor data module 324 (e.g., via the modem 342 of the communication circuit 322) may provide the compressed sensor data to the remote device 310.

The sensor 326 may be integrated with the wearable device 320 or may be remote and may include circuitry to collect sensor data directly. Examples of the sensor 326 may include gyroscopes, accelerometers, GPS receivers, microphones, light detection circuits, proximity sensing circuits, barometers, etc.

In operation, the system 300 may include the communication circuit 322, the compressible sensor data module 324, and the sensor 326 of the wearable device 320 to collect various kinds of sensor data. In many cases, the wearable device 320 may be located away from the remote device 310 used to process the collected sensor data. Therefore, the collected sensor data may be transmitted from the wearable device 320 to the remote device 310 over a wireless communication channel. In some examples, due to a form factor restriction and/or long usage time requirement, the power consumption of the wearable device 320 may be very restricted. Thus, a low power communication channel may be used to transmit the data to the remote device 310. An example of a low power communication channel may include Bluetooth® Low Energy (BLE) technology.

In some embodiments, to accommodate the bandwidth and power constraints, the compression engine 344 may apply a compression algorithm to the collected sensor data received from the sensor 326 to provide a compressed sensor data signal, and the compressed sensor data signal may be provided to the remote device 310. The compression algorithm may exploit redundancy or repetition in the collected sensor data to reduce information to be transmitted to the remote device 310. The remote device 310 may reconstruct the collected sensor data using a reconstruction algorithm. The communication circuit at the remote device 310 may detect the link quality and provide the link quality to the communication circuit 322 (e.g., via back channels). Based on the detected link quality, the compression engine 344 may set a level of compression to apply to the collected sensor data. The selected compression level may reduce a transmission bitrate of the collected sensor data by a factor of one of 2, 4, 6, 8, or more. In some examples, the compression algorithm may include one of differential pulse-code modulation (DPCM) or adaptive delta pulse-code modulation (ADPCM). In some examples, the compression algorithm may be reset responsive to an indication the link to the communication circuit 212 has been lost. In some examples, the compression algorithm may be reset responsive to an indication from the remote device 310 that previous data packets have not been successfully transmitted and received. The compression algorithm may also be reset to limit or prevent error propagation caused by the compression algorithm based on an indication from the remote device 310.

Figure 4:
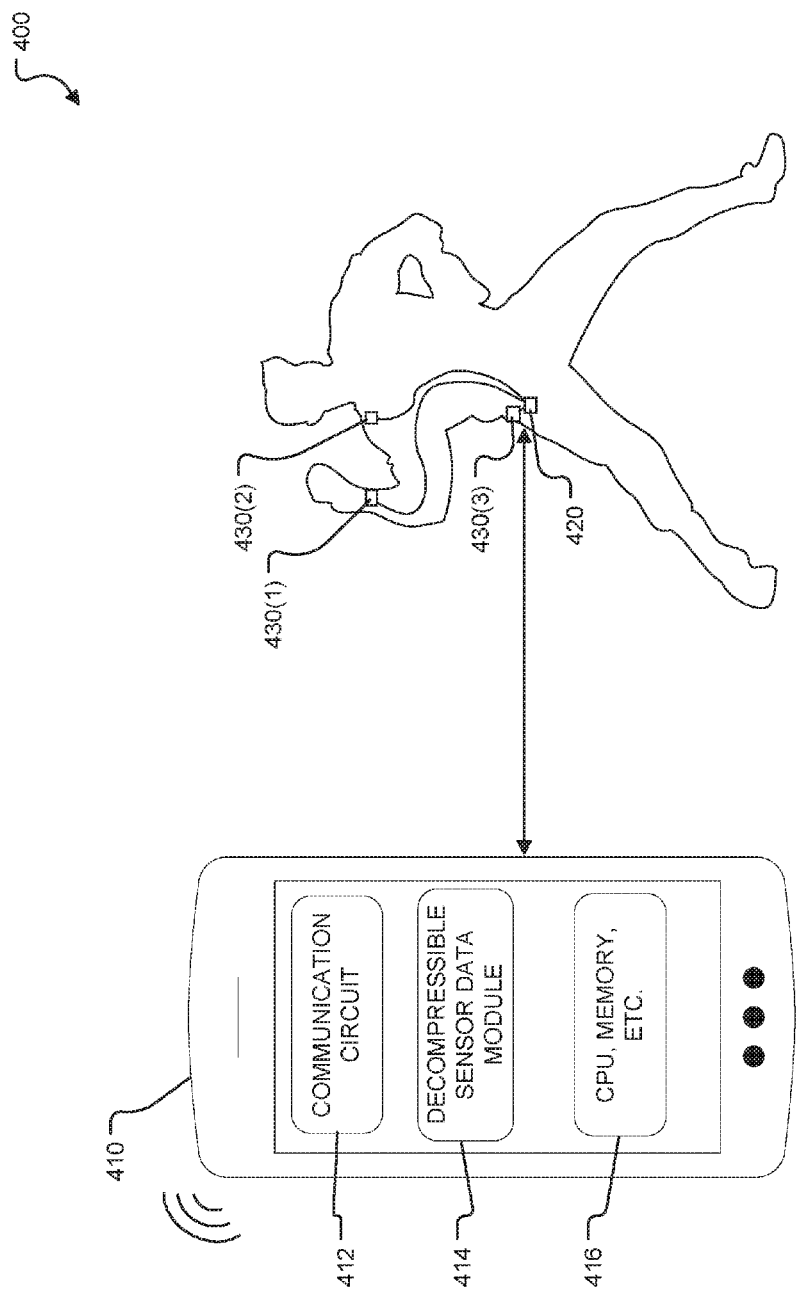
FIG. 4 illustrates a low power compressible sensor system to compress sensor data in a motion implementation in accordance with some embodiments of the disclosure.

FIG. 4 illustrates a low power compressible sensor system 400 to compress sensor data in a motion implementation in accordance with some embodiments of the disclosure. The system 400 may include a remote device 410 coupled a wearable device 420. The wearable device 420 may be coupled to one or more of the sensors 430(1-3), in some examples.

The remote device 410 may include a communication circuit 412, a decompressible sensor data module 414, and a CPU, memory, etc. 416. The communication circuit 412 may communicate with the wearable device 420 via a radio to receive collected sensor data signals using a low power/energy protocol, such as a Bluetooth® Low Energy (BLE). The decompressible sensor data module 414 may include circuitry to receive the collected sensor data signals from the communication circuit 412, and may reconstruct the collected sensor data based on the signals. In some examples, the decompressible sensor data module 414 may also include an algorithm to select a subsampling rate for several of the sensors 430(1-3) based on error rates and other criteria. The CPU, memory, etc. 416 may include may include special circuitry and/or general-purpose hardware processor to perform specific functions with the collected sensor data reconstructed by the decompressible sensor data module 414. For example, the CPU, memory, etc. 416 may process the collected sensor data to display information to a user, such as a visual representation of motion data.

The wearable device 420 may include a respective communication circuit, a respective compressible sensor data module, and a respective sensor. The communication circuit may communicate with the remote device 410 over a channel via a respective radio to provide the collected sensor data. The communication circuit may further detect a channel throughput prior to communication, and may apply a compression algorithm on the collected sensor data to reduce a transmission bitrate based on the detected channel throughput. The compressible sensor data module may include an interface to receive the collected sensor data from one or more of the sensors 430(1-3). In some examples, the compressible sensor data module may control the sample rate of the one or more of the sensors 430(1-3) to control a transmission bandwidth. In the specific example of FIG. 4, the collected sensor data may include motion data. The compressible sensor data module may provide the collected sensor data to the communication circuit.

Each of the sensors 430(1-3) may include circuitry to collect sensor data directly. Examples of the sensors 430(1-3) may include accelerometers, such as three-axis accelerometers. The sensors 430(1-3) may be wearable devices, in some examples, such as a smartwatch, a smart bracelet, smart glasses, a smart ring, a shoe insert, e-textiles, or the like.

In operation, the system 400 may include the respective the wearable device 420 and the sensors 430(1-3) to collect various motion data in an application where a person is throwing a ball. In many cases, the sensors 430(1-3) may be located away from the remote device 410 used to process the collected sensor data. Therefore, the collected sensor data may be transmitted from the sensors to the communication circuit 412 of the remote device 410 over a wireless communication channel.

In an example to accommodate bandwidth constraints, the remote device 410 may control a sample rate of the sensors 430(1-3) to reduce bandwidth consumption, and thereby shifting a processing burden to the remote device 410 during signal reconstruction, as compared with a processing burden of executing a compression algorithm at the wearable devices 420. The remote device 410 may exploit previously collected information about the sensors (e.g., type of sensor and location of a wearable sensor) of sensor data and adjust a different subsampling rate for each of the sensors 430(1-3). In other words, the subsampling rate is adjusted individually according to the sparseness of sensor data from a specific sensor.

In a wearable application monitoring motion of different areas of a body of a person, certain sensors may have more sparse motion data than other sensors. In the example depicted in FIG. 4, the sensor 430(2) on the shoulder and the sensor 430(3) on the hip of a baseball pitcher throwing a pitch may have much more sparse data than the sensor 430(1) on the wrist. In this example, the wearable device 420 may control the sensors to use sub-Nyquist sampling techniques. To determine an optimal subsampling rate without previously collected information, the decompressible sensor data module 414 may use test or training data. For example, the wearable device 420 may collect sample measurements from one of the sensors 430(1-3). The wearable device 420 may iteratively provide (e.g., stream) a signal that represents the collected sample data to the decompressible sensor data module 414 (via the communication circuit 412) at various subsampled rates (including the fully sampled rate). The decompressible sensor data module 414 may reconstruct the collected sensor data based on the fully sampled signal and the various subsampled signals. The decompressible sensor data module 414 may calculate the root-mean-square deviations (RMSD) of the reconstructions of the various sub-sampled signals with the reconstruction of the fully sampled signal. The decompressible sensor data module 414 may select a target sampling rate that is a lowest sampling rate at which the RMSD falls within a threshold of acceptable errors. The selected sampling rate for the one of the sensors 430(1-3) used in a specific, known application may be stored at the decompressible sensor data module 414. The decompressible sensor data module 414 may use this previously collected information to select the subsampling rate in future applications, thereby avoiding having to undergo all or a portion of the training procedure.

For the training of the decompressible sensor data module 414, according to a principle in compressible sensing, a small number of measurements without previously collected knowledge of a signal structure may be sufficient for recovering the fully-sampled signals (e.g., the fully sampled data). Depending on the application, the number of measurements may be much less than the number of samples required for the Nyquist rate. A signal may be considered sparse if the signal can be represented by a linear combination of the basis functions $W=\{W_1, W_2, \ldots W_n\}$. Then the given signal can be represented as:

$$x = \sum_{i=1}^{N} k_{n_i} W_{n_i}$$

where N≤M. Instead of capturing M size of data with the original sampling rate, only N size of samples is required. For typical sparseness of motion data in certain applications, such as athletics, N may be much smaller than M. A motion signal may be considered sparse when at least one coefficient of the basis functions is zero, because the same signal may be represented by another set of basis functions, thus making it compressible. That is, if there are redundant coefficients in the "compressible" representation, then some coefficients may be eliminated. As a result, compressible signal data consume less transmission bandwidth.

FIG. 4 depicts a setup of sports wearable for motion data collection from three different sources (e.g., wrist, shoulder and hip) via the sensors 430(1-3). The wearable device 420 may aggregate the motion data from the three sensors 430(1-3) and may stream the data to the remote device 410. In this particular application, the axis information associated with each accelerometer in the sensors 430(1-3) can be combined into a single is not important because the orientation of sensor is fixed differently on the human body and we assume the motion data to be orientation invariant in the data analysis. With the assumption of orientation invariance, we can combine motion values from each axis, $\{W_x, W_y, W_z\}$ into single magnitude of motion data:

$$W_{MAG} = \sqrt{W_x^2 + W_y^2 + W_z^2}$$

The system 400 may be trained to determine an optimal subsampling rate associated with each sensor source (e.g., calibrate). The calibration may only be required one time for each specific training application. During the calibration, a user (e.g., baseball player in this specific example) may perform a typical motion pattern (e.g., throwing a ball in this specific example). For the calibration, a user may perform each motion pattern a single time for a specified period of time (e.g., approximately 2 seconds). The wearable device 420 may store (e.g., in a memory or cache) respective collected sensor data from each of the sensors 430(1-3) at sampling fully-sampled rate. In some examples, the wearable device 420 may also store a device identifier received from each of the each of the sensors 430(1-3) with the collected sensor data. The device ID may be a unique ID can be associated with a source of motion data. Further, previously collected information may be derived from the device ID. For example, if an associated sensor of the sensors 430(1-3) is attached to a baseball player's shoulder, the sensor's ID can be used to retrieve the previously collected information associated with a sensor on a baseball player's should, as similar motion data from a similar motion pattern may be predicted, which may be more sparse than the motion from other sources, such as motion associated with a wrist.

After storing the collected sample data, the wearable device 420 may perform an iterative stepping algorithm that progressively steps down a subsample frequency for the signal provided to the remote device 410. In some examples, the step may be equal to 10 Hz. For example, in a first iteration, the collected sensor data may be packetized and streamed at a first frequency over a low power channel to the remote device 410. In a second iteration, the collected sensor data may be packetized and streamed at a step down from the first frequency over the low power channel to the remote device 410. This stepping down process may continue until the subsampling rate reaches a minimum frequency, such as 10 Hz or less.

Upon receiving the streamed signals with the collected sensor data sampled at various rates, the decompressible sensor data module 414 may reconstruct a respective representation of the collected sensor data for each signal using a reconstruction algorithm. Examples of a reconstruction of a densely sampled signal from sparsely sampled signal may include greedy algorithms, such as orthogonal matching pursuit, iterative algorithms such as gradient-descent, L1 optimization for linear programming, or a statistical approach using Bayesian modeling. In general, greedy algorithms may be preferred.

After reconstruction, the decompressible sensor data module 414 may calculate the root-mean-square deviations (RMSD) of each subsampled signal against the signal at a first sampling rate:

$$RMSD(W_{rec}, W_{ori}) = \sqrt{\frac{\sum_{i=1}^{n}(W_{rec_i} - W_{ori_i})^2}{n}}$$

where $W_{rec}$ and $W_{ori}$ are the reconstructed and original motion signals, respectively. The RMSD serves to aggregate the magnitudes of the errors in signal reconstruction for various times into a single measure. This calculation generates a single RMSD value associated with each subsampling rate. Generally, as the sampling rate decreases, the reconstruction error may increase. A selected sampling rate may be a lowest sampling rate that has an associated RMSD that falls within a threshold of acceptable errors. The streaming of motion magnitude values at subsampling rate is repeated for each 3 axis sensor source. After calibration, the optimal subsampling rate for each motion sensor is selected.

In some examples, if a pattern-matching algorithm is employed to analyze the collected sensor data at the remote device 410, measurement of errors in the pattern-matching by way of the signals directly may be preferred to reconstructing the collected sensor data and determining errors using the RMSD process.

The system 400 may provide methods for compressing sensor data to be transmitted over a low power communication channel, including by controlling the bitrate through sensor data compression, or by controlling a sample rate of a sensor.

Figure 5:
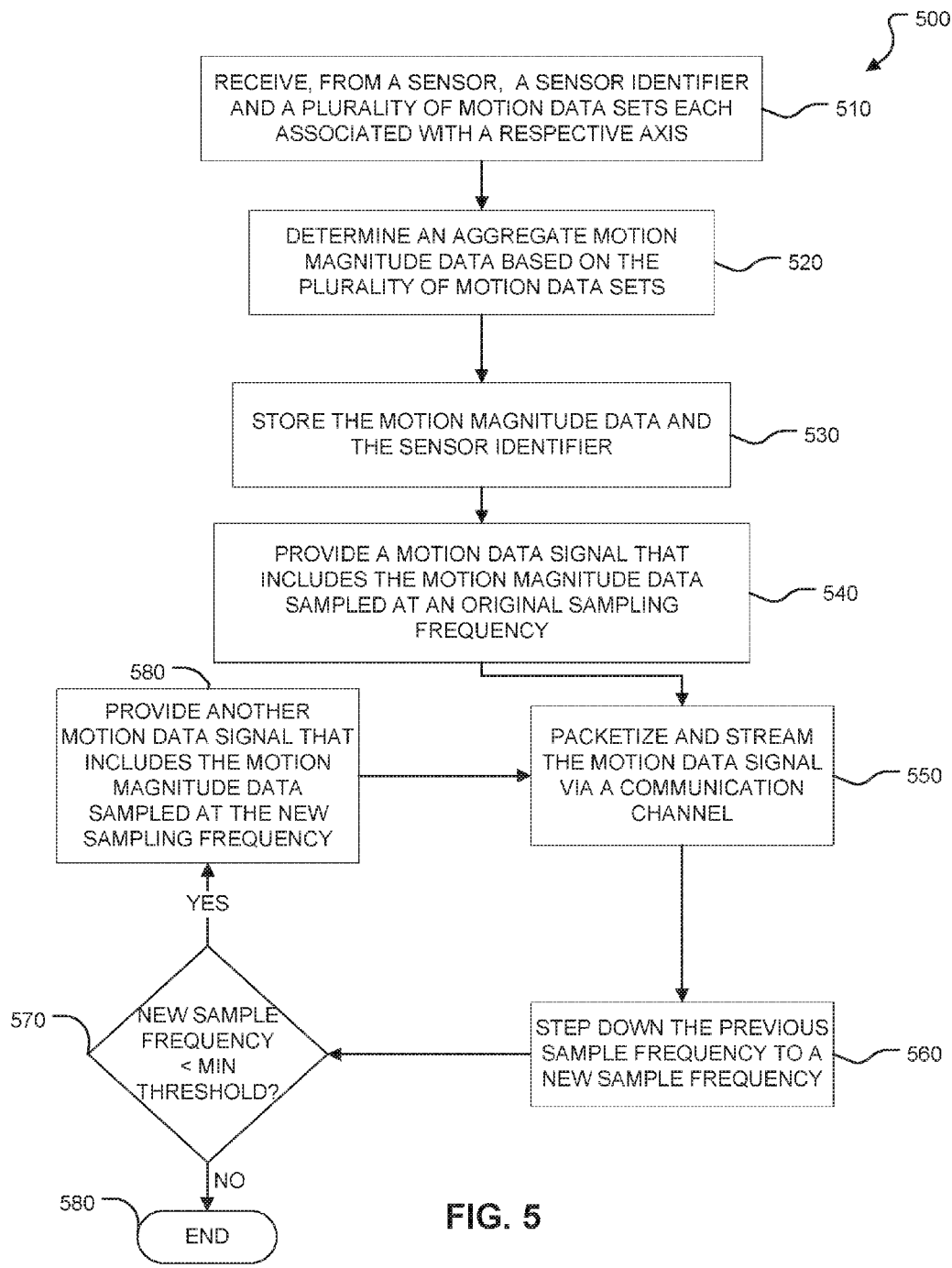
FIG. 5 illustrates a flow diagram of a method to train a compressible data motion sensor system in accordance with some embodiments of the disclosure.

FIG. 5 illustrates a flow diagram of a method 500 to train a compressible data motion sensor system in accordance with some embodiments of the disclosure. The method 500 may be implemented in the system 100 of FIG. 1, the system 200 of FIG. 2, the system 300 of FIG. 3, the system 400 of FIG. 4, or combinations thereof.

The method 500 may include receiving, from a sensor, a sensor identifier and a plurality of motion data sets each associated with a respective axis, at 510. The sensor may include the integrated sensor 126 and/or the sensors 130(1-M) of FIG. 1, sensors at the wearable devices 220(1-4), the sensor 326 of FIG. 3, the sensors 430(1-3) of FIG. 3, or combinations thereof. The sensor identifier and the plurality of motion data sets may be received at a communication circuit of a wearable device, such as the communication circuit 122 of the wearable devices 120(1-N) of FIG. 1, the communication circuit of the wearable devices 220(1-4) of FIG. 2, the communication circuit 322 of FIG. 3, a communication circuit of the wearable device 420 of FIG. 4, or combinations thereof. The sensor may be a 3-axis accelerometer, in some examples.

The method 500 may further include determining an aggregate motion magnitude data based on the plurality of motion data sets, at 520. The aggregate motion magnitude $W_{MAG}$ for a 3-axis accelerometer (e.g., $\{W_x, W_y, W_z\}$) may be determined as follows:

$$W_{MAG} = \sqrt{W_x^2 + W_y^2 + W_z^2}$$

The method 500 may further include storing the motion magnitude data and the sensor identifier, at 530. The motion data may be stored at the communication circuit. The method 500 may further include providing a motion data signal that includes the fully-sampled motion magnitude data sampled at a first sampling frequency, at 540. The method 500 may further include packetizing and streaming the motion data signal via a communication channel, at 550. The communication channel may be a low power communication channel, such as a Bluetooth low-energy channel.

The method 500 may further include stepping down the previous sample frequency to a new sample frequency, at 560. For example, the new sample frequency may be 10 Hz or some other selected step size frequency less than the previous sample frequency.

The method 500 may further include determining whether the new sample frequency is less than a minimum threshold, at 570. If the new sample frequency is less than the minimum threshold, at 570, the method 500 may further include providing another motion data signal that includes the motion magnitude data sampled at the new sampling frequency. If the new sample frequency is not less than the minimum threshold, at 570, then the method 500 may end, at 580.

Figure 6:
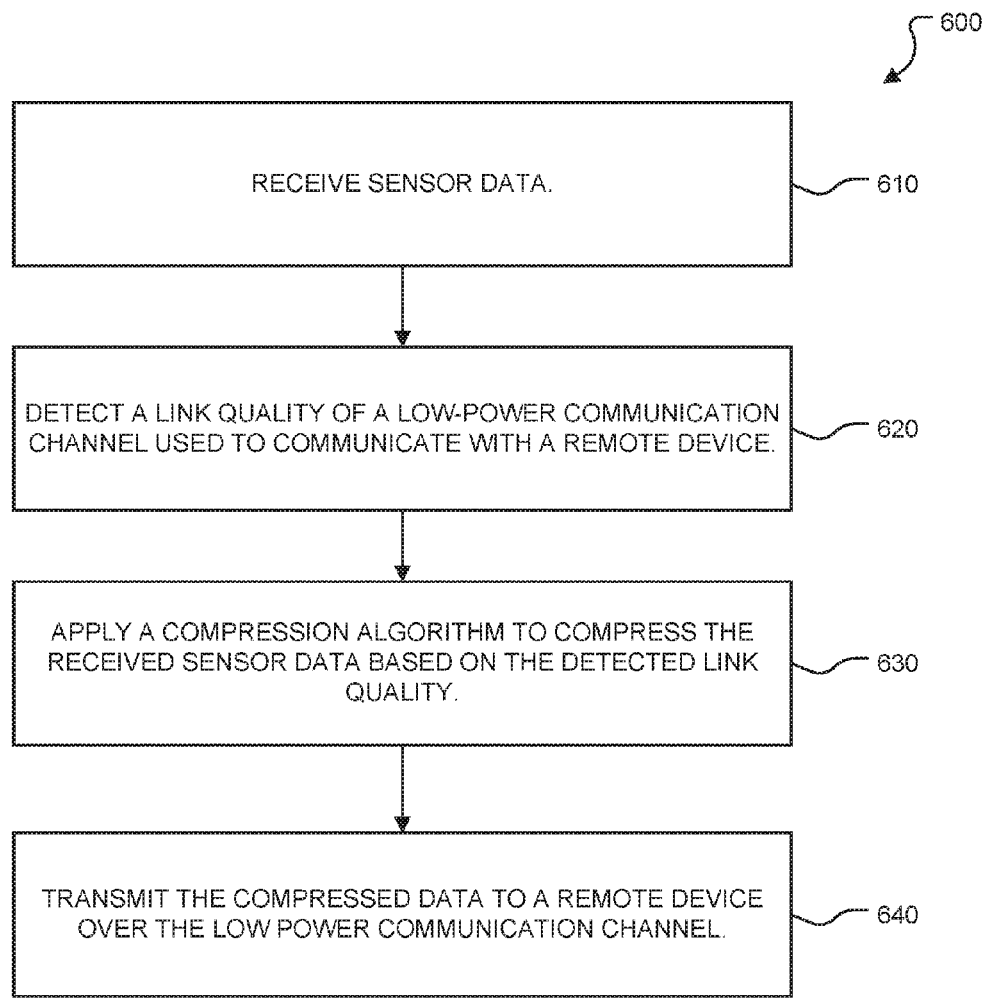
FIG. 6 illustrates a flow diagram of a method to compress sensor data at a wearable device in accordance with some embodiments of the disclosure.

FIG. 6 illustrates a flow diagram of a method 600 to compress sensor data at a wearable device in accordance with some embodiments of the disclosure. The method 600 may be implemented in the wearable devices 120(1-N) of FIG. 1, the wearable devices 220(1-4) of FIG. 2, the wearable device 320 of FIG. 3, the wearable device 420 of FIG. 4, or combinations thereof.

The method 600 may include receiving sensor data, at 610. The sensor data may be provided by a sensor, such as the integrated sensor 126 and/or the sensors 130(1-M) of FIG. 1, sensors at the wearable devices 220(1-4), the sensor 326 of FIG. 3, the sensors 430(1-3) of FIG. 3, or combinations thereof. The sensor data sets may be received at a communication circuit of a wearable device, such as the communication circuit 122 of the wearable devices 120(1-N) of FIG. 1, the communication circuit of the wearable devices 220(1-4) of FIG. 2, the communication circuit 322 of FIG. 3, a communication circuit of the wearable device 420 of FIG. 4, or combinations thereof. The sensor may be a 3-axis accelerometer, in some examples. The sensor data may include at least one of motion data, pressure data, sound data, light data, location data, or proximity data.

The method 600 may include receiving, from a remote device, a link quality of a low-power communication channel used to communicate with the remote device, 620. The remote device may include the remote device 110 of FIG. 1, the remote device 210 of FIG. 2, the remote device 310 of FIG. 3, the remote device 410 of FIG. 4, or combinations thereof. Reception of the link quality of the low-power communication channel used to communicate with the remote device may be via a modem, such as the modem 342 of FIG. 3. The low-power communication channel may include a Bluetooth Low Energy channel.

The method 600 may further include applying a compression algorithm to compress the received sensor data based on the detected link quality, at 630. In some examples, the compression algorithm may include adaptive delta pulse code modulation. The applied compression level may be selected from a set of compression levels based on the link quality. If the link quality changes, the compression level may be updated to reflect the change. Compression of the sensor data my include compressing the sensor data to reduce a transmission bandwidth of the sensor data by a factor of two or more, including a factor of 2, 4, 8, etc. The method 600 may further include transmitting the compressed data to a remote device over the low power communication channel, at 640.

In some examples, the method 600 may further include resetting the compression algorithm in response to an indication from that a link to the remote device has been lost. In some examples, the method 600 may further include resetting the compression algorithm in response to an indication of lost sensor data packets from the modem.

Figure 7:
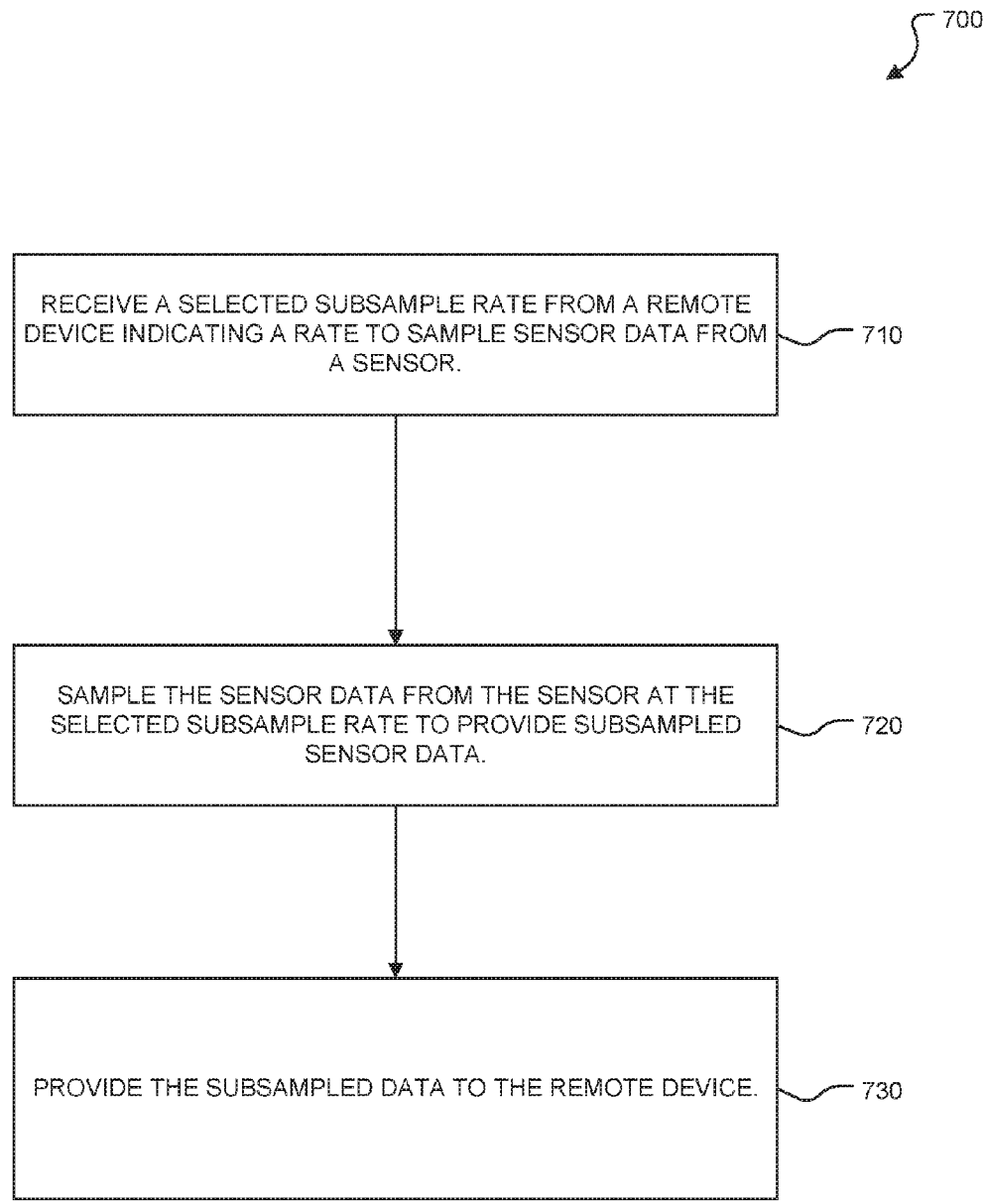
FIG. 7 illustrates a flow diagram of a method to compress sensor data from a wearable device in accordance with some embodiments of the disclosure.

FIG. 7 illustrates a flow diagram of a method 700 to compress sensor data from a wearable device in accordance with some embodiments of the disclosure. The method 700 may be implemented in the wearable devices 120(1-N) of FIG. 1, the wearable devices 220(1-4) of FIG. 2, the wearable device 320 of FIG. 3, the wearable device 420 of FIG. 4, or combinations thereof.

The method 700 may include receiving a selected subsample rate from a remote device indicating a rate to sample sensor data from a sensor, at 710. The selected subsample rate is less than a fully-sampled rate. The remote device may include the remote device 110 of FIG. 1, the remote device 210 of FIG. 2, the remote device 310 of FIG. 3, the remote device 410 of FIG. 4, or combinations thereof. The sensor may include the integrated sensor 126 and/or the sensors 130(1-M) of FIG. 1, sensors at the wearable devices 220(1-4), the sensor 326 of FIG. 3, the sensors 430(1-3) of FIG. 3, or combinations thereof. The selected subsample rate may be received at a communication circuit of a wearable device, such as the communication circuit 122 of the wearable devices 120(1-N) of FIG. 1, the communication circuit of the wearable devices 220(1-4) of FIG. 2, the communication circuit 322 of FIG. 3, a communication circuit of the wearable device 420 of FIG. 4, or combinations thereof. The sensor may be a 3-axis accelerometer, in some examples. The sensor data may include at least one of motion data, pressure data, sound data, light data, location data, or proximity data.

The method 700 may include sampling the sensor data from the sensor at the selected subsample rate to provide subsampled sensor data, 720. The method 700 may further include providing the subsampled data to the remote device, at 730.

The method 700 may include a training procedure to determine the selected subsample rate. The training procedure may include storing fully-sampled sensor data, and providing the fully-sampled sensor data to the remote device. The training procedure may further include, starting from with a sample rate of the fully-sampled sensor data, iteratively stepping down a previously sample rate to a new sample rate, and providing the sensor data to the remote device at the new sample rate. The training procedure may further include stopping provision of the sensor data to the remote device when the new sample rate is less than a minimum threshold.

In some examples, method 700 may further include receiving a second selected subsample rate from the remote device indicating a rate to sample second sensor data from a second sensor. The second subsample rate may be different than the first subsample rate. The method 700 may further include sampling the second sensor data from the second sensor at the second selected subsample rate to provide second subsampled sensor data, and providing the second subsampled data to the remote device.

Figure 8:
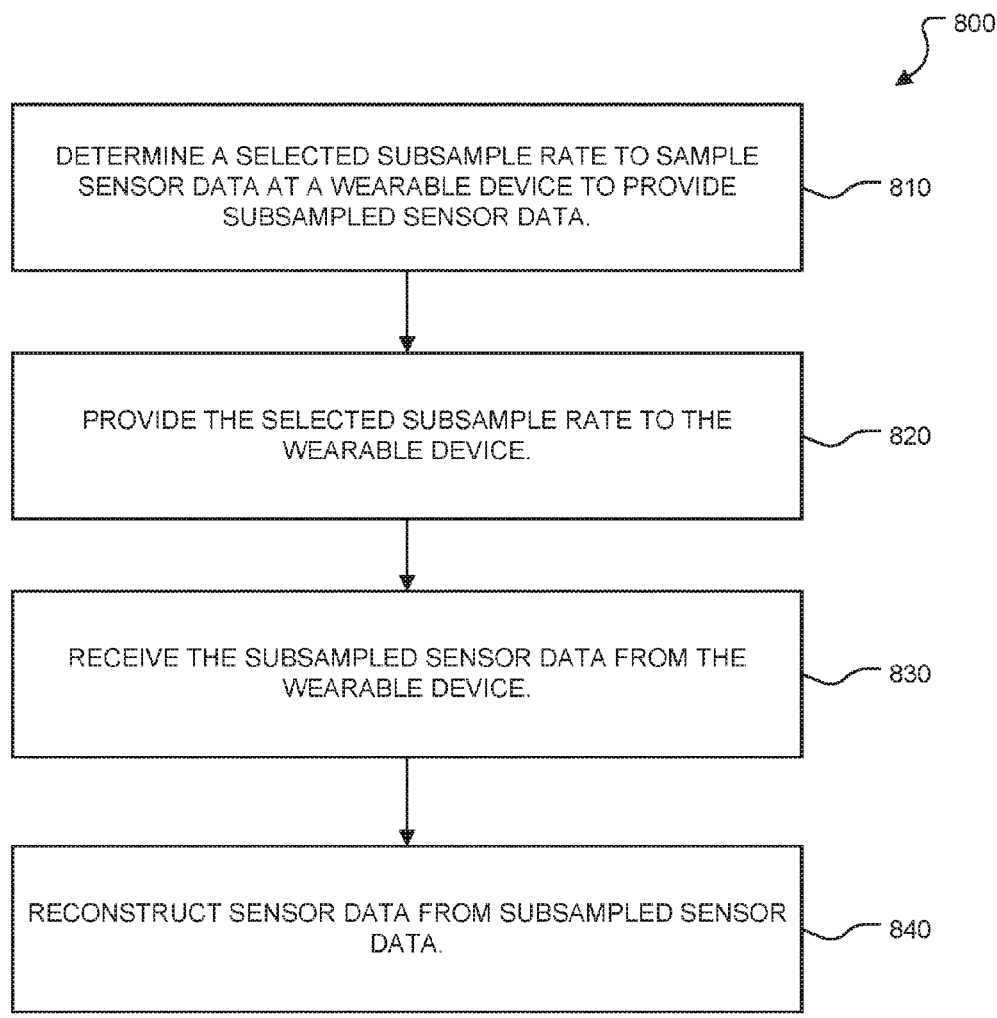
FIG. 8 illustrates a flow diagram of a method to receive compressed sensor data at a remote device in accordance with some embodiments of the disclosure.

FIG. 8 illustrates a flow diagram of a method 800 to receive compressed sensor data at a remote device in accordance with some embodiments of the disclosure. The method 800 may be implemented in the remote device 110 of FIG. 1, the remote device 210 of FIG. 2, the remote device 310 of FIG. 3, the remote device 410 of FIG. 4, or combinations thereof.

The method 800 may include determining a selected subsample rate to sample sensor data at a wearable device to provide subsampled sensor data, at 810. The selected subsample rate is less than a fully-sampled rate. The wearable device may include the wearable devices 120(1-N) of FIG. 1, the wearable devices 220(1-4) of FIG. 2, the wearable device 320 of FIG. 3, the wearable device 420 of FIG. 4, or combinations thereof. The sensor data may be received from a sensor, such as the integrated sensor 126 and/or the sensors 130(1-M) of FIG. 1, sensors at the wearable devices 220(1-4), the sensor 326 of FIG. 3, the sensors 430(1-3) of FIG. 3, or combinations thereof. The selected subsample rate may be selected by a compressible sensor data module, such as the decompressible sensor data module 114 of FIG. 1, the decompressible sensor data module 214 of FIG. 2, the decompressible sensor data module 414 of FIG. 4, or combinations thereof. The sensor data may include at least one of motion data, pressure data, sound data, light data, location data, or proximity data. In some examples, determining the selected subsample rate may include receiving an identifier associated with a sensor, and selecting a previously selected subsample rate as the selected subsample rate based on the identifier.

The method 800 may include providing the selected subsample rate to a wearable device, 820. The method 800 may further include receiving the subsampled sensor data from the wearable device, at 830. The method 800 may further include reconstructing sensor data from subsampled sensor data, at 840.

The method 800 may include a training procedure to determine the selected subsample rate. The training procedure may include receiving, from the wearable device, fully-sampled sensor data and a plurality of sensor data sets each sampled at a different respective subsample rate, and generating an individual reconstructed sample data set for each of the plurality of sensor data sets. Generating the individual reconstructed sample data set for each of the plurality of sensor data sets may include applying a reconstruction algorithm to each of the each of the plurality of sensor data sets to provide the individual reconstructed sample data set. The reconstruction algorithm may include one of an orthogonal matching pursuit, an iterative algorithm, L1 optimization for linear programming, or a statistical approach using Bayesian modeling.

The training procedure may further include sequentially compare the fully-sampled sensor data with each respective individual reconstructed sample data set, and selecting the subsample rate based on the comparisons. Sequentially comparing the fully-sampled sensor data with each respective individual reconstructed sample data set may include determining respective root-mean-square deviations (RMSD) for each sequential comparison; and selecting a lowest subsample rate that has RMSD errors that are below a maximum threshold. Selection of the subsample rate may include selecting the subsample rate include selection of a lowest subsample rate that falls within an error tolerance based on the comparison. The training procedure may further include stopping provision of the sensor data to the remote device when the new sample rate is less than a minimum threshold.

The fully-sampled sensor data and the plurality of sensor data sets may each be associated with a sensor. The training procedure may further include receiving, from the wearable device, an identifier associated with the sensor, and associating the selected subsample rate with the sensor using the identifier.

Figure 9:
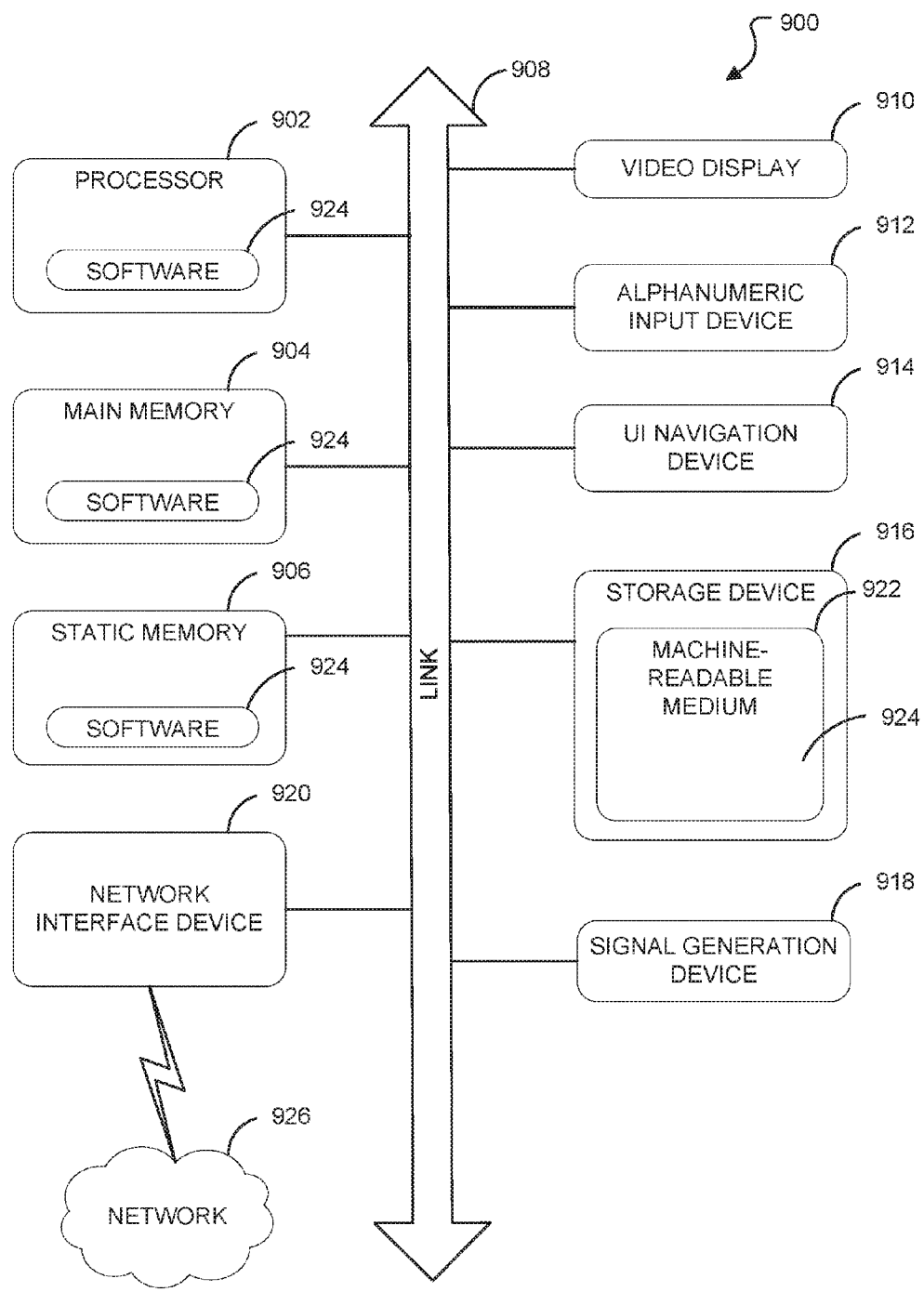
FIG. 9 illustrates a block diagram illustrating a machine in the example form of a computer system in accordance with some embodiments of the disclosure.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor unit 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyroscope, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor unit 902 during execution thereof by the computer system 900, with the main memory 904, static memory 906, and the processor unit 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

ADDITIONAL NOTES & EXAMPLES

Example 1 is a wearable device to compress sensor data, the wearable device comprising: a sensor including circuitry to sense sensor data; a communication circuit to receive, from a remote device, a detected link quality of a low-power communication channel used to communicate with the remote device, the communication circuit further to transmit compressed data to a remote device over the low power communication channel; and a compressible sensor data module to apply a compression algorithm to compress received sensor data based on the detected link quality to provide the compressed sensor data.

In Example 2, the subject matter of Example 1 optionally includes wherein the communication circuit includes a modem to receive the link quality of the low-power communication channel.

In Example 3, the subject matter of Example 2 optionally includes wherein the compressible sensor data module includes a compression engine to receive the link quality and to compress the sensor data based on the link quality.

In Example 4, the subject matter of any one or more of Examples 2-3 optionally include wherein the compression engine includes adaptive delta pulse code modulation to compress the sensor data.

In Example 5, the subject matter of Example 4 optionally includes wherein to compress the sensor data based on the link quality, the compression engine to compress the sensor data to reduce a transmission bandwidth by a factor of two or more.

In Example 6, the subject matter of any one or more of Examples 2-5 optionally include wherein the compression engine resets in response to an indication from the modem that a link to the remote device has been lost.

In Example 7, the subject matter of any one or more of Examples 2-6 optionally include wherein the compression engine resets in response to an indication of lost sensor data packets from the modem.

In Example 8, the subject matter of any one or more of Examples 1-7 optionally include wherein the sensor collects at least one of motion data, pressure data, sound data, light data, location data, or proximity data.

In Example 9, the subject matter of any one or more of Examples 1-8 optionally include wherein the low-power communication channel is a Bluetooth Low Energy channel.

Example 10 is a wearable device to compress sensor data, the wearable device comprising: a compressible sensor data module to receive a selected subsample rate from a remote device indicating a rate to sample sensor data from a sensor, the selected subsample rate being less than a fully-sampled rate, the compressible sensor data module to sample the sensor data from the sensor at the selected subsample rate to provide subsampled sensor data; and a communication circuit to provide the subsampled data to the remote device.

In Example 11, the subject matter of Example 10 optionally includes wherein, during training to determine the selected subsample rate, the compressible sensor data module to store fully-sampled sensor data, the compressible sensor data module, via the communication circuit, further to provide the fully-sampled sensor data to the remote device, wherein, starting from with a sample rate of the fully-sampled sensor data, the compressible sensor data module, to iteratively step down a previously sample rate to a new sample rate and to provide, via the communication circuit, the sensor data to the remote device at the new sample rate.

In Example 12, the subject matter of Example 11 optionally includes wherein, during the training to determine the selected subsample rate, the compressible sensor data module to stop provision of the sensor data to the remote device when the new sample rate is less than a minimum threshold.

In Example 13, the subject matter of any one or more of Examples 10-12 optionally include wherein the selected subsample rate is a first selected subsample rate, wherein the communication circuit further to receive a second selected subsample rate from the remote device indicating a rate to sample second sensor data from a second sensor, wherein the second subsample rate is different than the first subsample rate, the compressible sensor data module to sample the second sensor data from the second sensor at the second selected subsample rate to provide second subsampled sensor data, the communication circuit to provide the second subsampled data to the remote device.

In Example 14, the subject matter of any one or more of Examples 10-13 optionally include the sensor including circuitry to sense the sensor data.

Example 15 is a remote device to receive compressed sensor data, the remote device comprising: a decompressible sensor data module to determine a selected subsample rate to sample sensor data at a wearable device to provide subsampled sensor data, the decompressible sensor data module further to reconstruct sensor data from subsampled sensor data; and a communication circuit to provide the selected subsample rate to the wearable device, the communication circuit further to receive the subsampled sensor data from the wearable device and to provide the subsampled data to the decompressible sensor data module.

In Example 16, the subject matter of Example 15 optionally includes wherein, during training to determine the selected subsample rate: the communication circuit to receive, from the wearable device, a fully-sampled sensor data and a plurality of sensor data sets each sampled at a different respective subsample rate, the communication circuit to provide the fully-sampled sensor data and the plurality of sensor data sets to the decompressible sensor data module, and the decompressible sensor data module to generate an individual reconstructed sample data set for each of the plurality of sensor data sets, the decompressible sensor data module further to sequentially compare the fully-sampled sensor data with each respective individual reconstructed sample data set to select the subsample rate.

In Example 17, the subject matter of Example 16 optionally includes wherein, during training to determine the selected subsample rate, the decompressible sensor data module to select the subsample rate include selection of a lowest subsample rate that falls within an error tolerance based on the comparison.

In Example 18, the subject matter of Example 17 optionally includes wherein, during the training to determine the selected subsample rate, the decompressible sensor data module to iteratively compare the fully-sampled sensor data with each respective individual reconstructed sample data set includes determination of respective root-mean-square deviations (RMSD) for each iterative comparison, and to select a lowest subsample rate that has RMSD errors that are below a maximum threshold.

In Example 19, the subject matter of any one or more of Examples 17-18 optionally include wherein, during the training to determine the selected subsample rate, the decompressible sensor data module to generate an individual reconstructed sample data set for each of the plurality of sensor data sets includes applying a reconstruction algorithm to each of the each of the plurality of sensor data sets to provide the individual reconstructed sample data set.

In Example 20, the subject matter of any one or more of Examples 16-19 optionally include wherein the reconstruction algorithm includes one of an orthogonal matching pursuit, an iterative algorithm, L1 optimization for linear programming, or a statistical approach using Bayesian modeling.

In Example 21, the subject matter of any one or more of Examples 16-20 optionally include wherein the fully-sampled sensor data and the plurality of sensor data sets are each associated with a sensor, wherein, during the training to determine the selected subsample rate: the communication circuit to receive, from the wearable device, an identifier associated with the sensor, and the decompressible sensor data module to associate the selected subsample rate with the sensor using the identifier.

In Example 22, the subject matter of any one or more of Examples 15-21 optionally include wherein the decompressible sensor data module to determine the selected subsample rate includes receiving an identifier associated with a sensor, and selecting a previously selected subsample rate as the selected subsample rate based on the identifier.

Example 23 is a method to compress sensor data at a wearable device, the method comprising: receiving sensor data; receiving, from a remote device, a link quality of a low-power communication channel used to communicate with the remote device; applying a compression algorithm to compress the received sensor data based on the received link quality; and transmitting the compressed data to a remote device over the low power communication channel.

In Example 24, the subject matter of Example 23 optionally includes wherein receiving the link quality of the low-power communication channel used to communicate with the remote device is via a modem.

In Example 25, the subject matter of Example 24 optionally includes wherein the compression algorithm includes adaptive delta pulse code modulation.

In Example 26, the subject matter of Example 25 optionally includes wherein compressing the sensor data based on the link quality includes compressing the sensor data to reduce a transmission bandwidth of the sensor data by a factor of two or more.

In Example 27, the subject matter of any one or more of Examples 24-26 optionally include resetting the compression algorithm in response to an indication from that a link to the remote device has been lost.

In Example 28, the subject matter of any one or more of Examples 24-27 optionally include resetting the compression algorithm in response to an indication of lost sensor data packets from the modem.

In Example 29, the subject matter of any one or more of Examples 23-28 optionally include wherein the sensor data includes at least one of motion data, pressure data, sound data, light data, location data, or proximity data.

In Example 30, the subject matter of any one or more of Examples 23-29 optionally include wherein the low-power communication channel is a Bluetooth Low Energy channel.

Example 31 is at least one machine-readable medium including instructions that, when executed on a machine cause the machine to perform any of the methods of Examples 23-31.

Example 32 is an apparatus comprising means for performing any of the methods of Examples 23-31.

Example 33 is a method to compress data from a wearable device, the method comprising: receiving a selected subsample rate from a remote device indicating a rate to sample sensor data from a sensor, the selected subsample rate being less than a fully-sampled rate, sampling the sensor data from the sensor at the selected subsample rate to provide subsampled sensor data; and providing the subsampled data to the remote device.

In Example 34, the subject matter of Example 33 optionally includes during training to determine the selected subsample rate: storing a set of fully-sampled sensor data; providing the fully-sampled sensor data to the remote device; starting from with a sample rate of the fully-sampled sensor data, iteratively: stepping down a previously sample rate to a new sample rate; and providing the sensor data to the remote device at the new sample rate.

In Example 35, the subject matter of Example 34 optionally includes wherein, during the training to determine the selected subsample rate, stopping provision of the sensor data to the remote device when the new sample rate is less than a minimum threshold.

In Example 36, the subject matter of any one or more of Examples 33-35 optionally include wherein the selected subsample rate is a first selected subsample rate, the method further comprising: receiving a second selected subsample rate from the remote device indicating a rate to sample second sensor data from a second sensor, wherein the second subsample rate is different than the first subsample rate; sampling the second sensor data from the second sensor at the second selected subsample rate to provide second subsampled sensor data; and providing the second subsampled data to the remote device.

Example 37 is at least one machine-readable medium including instructions that, when executed on a machine cause the machine to perform any of the methods of Examples 33-36.

Example 38 is an apparatus comprising means for performing any of the methods of Examples 33-36.

Example 39 is a method to receive compressed sensor data at a remote device, the method comprising: determining a selected subsample rate to sample sensor data at a wearable device to provide subsampled sensor data, the selected subsample rate less than a fully-sampled rate; providing the selected subsample rate to the wearable device; receiving the subsampled sensor data from the wearable device; and reconstructing sensor data from subsampled sensor data.

In Example 40, the subject matter of Example 39 optionally includes during training to determine the selected subsample rate: receiving, from the wearable device, an fully-sampled set of sensor data and a plurality of sensor data sets each sampled at a different respective subsample rate; generating an individual reconstructed sample data set for each of the plurality of sensor data sets; sequentially comparing the fully-sampled sensor data with each respective individual reconstructed sample data set: and selecting the subsample rate based on the comparisons.

In Example 41, the subject matter of Example 40 optionally includes during training to determine the selected subsample rate, selecting the subsample rate include selection of a lowest subsample rate that falls within an error tolerance based on the comparison.

In Example 42, the subject matter of Example 41 optionally includes wherein sequentially comparing the fully-sampled sensor data with each respective individual reconstructed sample data set includes: determining respective root-mean-square deviations (RMSD) for each sequential comparison; and selecting a lowest subsample rate that has RMSD errors that are below a maximum threshold.

In Example 43, the subject matter of any one or more of Examples 41-42 optionally include wherein generating the individual reconstructed sample data set for each of the plurality of sensor data sets includes applying a reconstruction algorithm to each of the each of the plurality of sensor data sets to provide the individual reconstructed sample data set.

In Example 44, the subject matter of Example 43 optionally includes wherein the reconstruction algorithm includes one of an orthogonal matching pursuit, an iterative algorithm, L1 optimization for linear programming, or a statistical approach using Bayesian modeling.

In Example 45, the subject matter of any one or more of Examples 40-44 optionally include wherein the fully-sampled set of sensor data and the plurality of sensor data sets are each associated with a sensor, the method further comprising, during the training to determine the selected subsample rate: receiving, from the wearable device, an identifier associated with the sensor, and associating the selected subsample rate with the sensor using the identifier.

In Example 46, the subject matter of any one or more of Examples 39-45 optionally include wherein determining the selected subsample rate comprises: receiving an identifier associated with a sensor; and selecting a previously selected subsample rate as the selected subsample rate based on the identifier.

Example 47 is at least one machine-readable medium including instructions that, when executed on a machine cause the machine to perform any of the methods of Examples 39-46.

Example 48 is an apparatus comprising means for performing any of the methods of Examples 39-46.

Example 49 is an apparatus to compress sensor data at a wearable device, the apparatus comprising: means for receiving sensor data; means for receiving, from a remote device, a link quality of a low-power communication channel used to communicate with the remote device; means for applying a compression algorithm to compress the received sensor data based on the received link quality; and means for transmitting the compressed data to a remote device over the low power communication channel.

In Example 50, the subject matter of Example 49 optionally includes wherein means for receiving the link quality of the low-power communication channel used to communicate with the remote device is via a modem.

In Example 51, the subject matter of Example 50 optionally includes wherein the compression algorithm includes adaptive delta pulse code modulation.

In Example 52, the subject matter of Example 51 optionally includes wherein means for compressing the sensor data based on the link quality includes means for compressing the sensor data to reduce a transmission bandwidth of the sensor data by a factor of two or more.

In Example 53, the subject matter of any one or more of Examples 50-52 optionally include means for resetting the compression algorithm in response to an indication from that a link to the remote device has been lost.

In Example 54, the subject matter of any one or more of Examples 50-53 optionally include means for resetting the compression algorithm in response to an indication of lost sensor data packets from the modem.

In Example 55, the subject matter of any one or more of Examples 49-54 optionally include wherein the sensor data includes at least one of motion data, pressure data, sound data, light data, location data, or proximity data.

In Example 56, the subject matter of any one or more of Examples 49-55 optionally include wherein the low-power communication channel is a Bluetooth Low Energy channel.

Example 57 is an apparatus to compress data from a wearable device, the apparatus comprising: means for receiving a selected subsample rate from a remote device indicating a rate to sample sensor data from a sensor, the selected subsample rate being less than a fully-sampled rate, means for sampling the sensor data from the sensor at the selected subsample rate to provide subsampled sensor data; and means for providing the subsampled data to the remote device.

In Example 58, the subject matter of Example 57 optionally includes during training to determine the selected subsample rate: means for storing a set of fully-sampled sensor data; means for providing the fully-sampled sensor data to the remote device; starting from with a sample rate of the fully-sampled sensor data, means for iteratively: stepping down a previously sample rate to a new sample rate; and providing the sensor data to the remote device at the new sample rate.

In Example 59, the subject matter of Example 58 optionally includes wherein, during the training to determine the selected subsample rate, means for stopping provision of the sensor data to the remote device when the new sample rate is less than a minimum threshold.

In Example 60, the subject matter of any one or more of Examples 57-59 optionally include wherein the selected subsample rate is a first selected subsample rate, the apparatus further comprising: means for receiving a second selected subsample rate from the remote device indicating a rate to sample second sensor data from a second sensor, wherein the second subsample rate is different than the first subsample rate; means for sampling the second sensor data from the second sensor at the second selected subsample rate to provide second subsampled sensor data; and means for providing the second subsampled data to the remote device.

Example 61 is an apparatus to receive compressed sensor data at a remote device, the apparatus comprising: means for determining a selected subsample rate to sample sensor data at a wearable device to provide subsampled sensor data, the selected subsample rate less than a fully-sampled rate; means for providing the selected subsample rate to the wearable device; means for receiving the subsampled sensor data from the wearable device; and means for reconstructing sensor data from subsampled sensor data.

In Example 62, the subject matter of Example 61 optionally includes during training to determine the selected subsample rate: means for receiving, from the wearable device, an fully-sampled set of sensor data and a plurality of sensor data sets each sampled at a different respective subsample rate; means for generating an individual reconstructed sample data set for each of the plurality of sensor data sets; means for sequentially comparing the fully-sampled sensor data with each respective individual reconstructed sample data set; and means for selecting the subsample rate based on the comparisons.

In Example 63, the subject matter of Example 62 optionally includes during training to determine the selected subsample rate, means for selecting the subsample rate include selection of a lowest subsample rate that falls within an error tolerance based on the comparison.

In Example 64, the subject matter of Example 63 optionally includes wherein means for sequentially comparing the fully-sampled sensor data with each respective individual reconstructed sample data set includes: means for determining respective root-mean-square deviations (RMSD) for each sequential comparison; and means for selecting a lowest subsample rate that has RMSD errors that are below a maximum threshold.

In Example 65, the subject matter of any one or more of Examples 63-64 optionally include wherein means for generating the individual reconstructed sample data set for each of the plurality of sensor data sets includes means for applying a reconstruction algorithm to each of the each of the plurality of sensor data sets to provide the individual reconstructed sample data set.

In Example 66, the subject matter of any one or more of Examples 62-65 optionally include wherein the reconstruction algorithm includes one of an orthogonal matching pursuit, an iterative algorithm, L1 optimization for linear programming, or a statistical approach using Bayesian modeling.

In Example 67, the subject matter of any one or more of Examples 62-66 optionally include wherein the fully-sampled set of sensor data and the plurality of sensor data sets are each associated with a sensor, the apparatus further comprising, during the training to determine the selected subsample rate: means for receiving, from the wearable device, an identifier associated with the sensor, and means for associating the selected subsample rate with the sensor using the identifier.

In Example 68, the subject matter of any one or more of Examples 61-67 optionally include wherein means for determining the selected subsample rate comprises: means for receiving an identifier associated with a sensor; and means for selecting a previously selected subsample rate as the selected subsample rate based on the identifier.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wearable device to compress sensor data, the wearable device comprising:
   a sensor including circuitry to sense sensor data;
   a communication circuit including a modem to:
      receive, from a remote device, a detected link quality of a low-power communication channel used to communicate with the remote device: and
      transmit compressed data to the remote device over the low power communication channel; and
   a compressible sensor data module including a compression engine to:
   receive the detected link quality;
   apply a selected compression algorithm to compress received sensor data, using adaptive delta pulse code modulation, based on the detected link quality to provide the compressed sensor data; and
   reset the selected compression algorithm in response to:
   an indication from the modem that a link to the remote device has been lost: or
   an indication of lost sensor data packets from the modem.

2. The wearable device of claim 1, wherein to compress the sensor data based on the link quality, the compression engine compresses the sensor data to reduce a transmission bandwidth by a factor of two or more.

3. The wearable device of claim 1, wherein the sensor collects at least one of motion data, pressure data, sound data, light data, location data, or proximity data.

4. The wearable device of claim 1, wherein the low-power communication channel is a Bluetooth Low Energy channel.

5. A method to compress sensor data at a wearable device, the method comprising:
   receiving sensor data;

receiving via a modem, from a remote device, a link quality of a low-power communication channel used to communicate with the remote device;

applying a selected compression algorithm to compress the received sensor data based on the received link quality, wherein the compression algorithm includes adaptive delta pulse code modulation;

resetting the selected compression algorithm in response to: an indication from the modem that a link to the remote device has been lost; or an indication of lost sensor data packets from the modem; and transmitting the compressed data to the remote device over the low power communication channel.

6. The method of claim 5, wherein compressing the sensor data based on the link quality includes compressing the sensor data to reduce a transmission bandwidth of the sensor data by a factor of two or more.

\* \* \* \* \*

UNITED STATES PATENT AND TRADEMARK OFFICE
CERTIFICATE OF CORRECTION

PATENT NO. : 9,986,069 B2  
APPLICATION NO. : 15/279307  
DATED : May 29, 2018  
INVENTOR(S) : Yeung et al.

Page 1 of 1

It is certified that error appears in the above-identified patent and that said Letters Patent is hereby corrected as shown below:

On the Title Page (*), in "Notice", in Column 1, Line 3, delete "days. days." and insert --days.-- therefor In the Claims In Column 24, Line 53, in Claim 1, delete "modern" and insert --modem-- therefor Signed and Sealed this
Twenty-eighth Day of May, 2019

Andrei Iancu
*Director of the United States Patent and Trademark Office*